June 7, 1960 H. G. RICH 2,939,672
FLEXIBLE DIAPHRAGM FLOW CONTROL VALVE
Filed Aug. 4, 1958 2 Sheets-Sheet 2
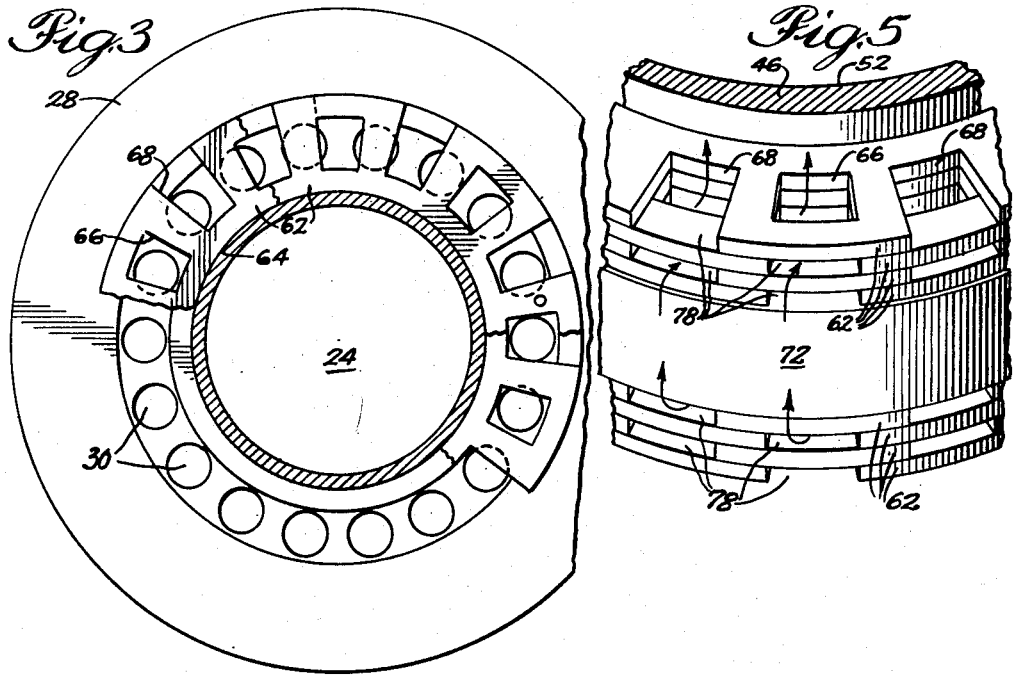
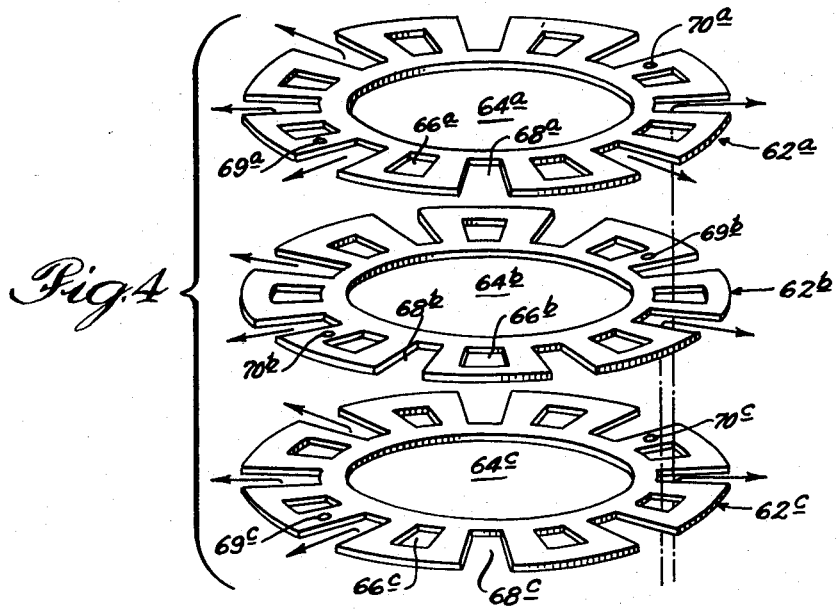
INVENTOR:
Herbert G. Rich,
BY Bair, Freeman & Molinare
ATTORNEYS.

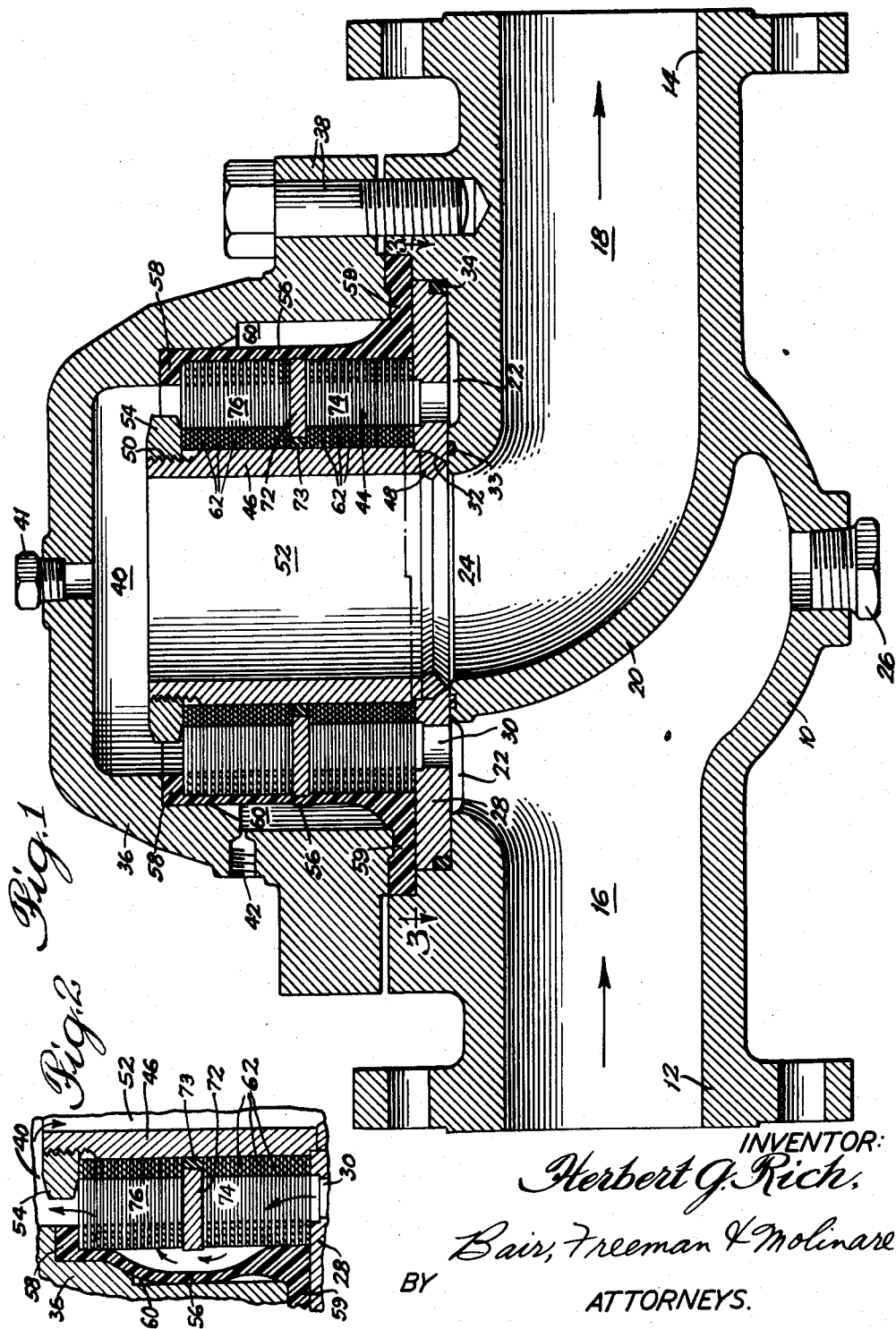

United States Patent Office 2,939,672
Patented June 7, 1960

2,939,672

FLEXIBLE DIAPHRAGM FLOW CONTROL VALVE

Herbert G. Rich, Marshalltown, Iowa, assignor to Fisher Governor Company, a corporation of Iowa Filed Aug. 4, 1958, Ser. No. 752,717

5 Claims. (Cl. 251—5)

This invention relates generally to a flexible diaphragm control valve, and more particularly to a valve construction employing a flexible diaphragm and a novel cooperating grid structure.

This invention represents improvements in flexible diaphragm supporting structures of the type having system applications as set forth in my Patent No. 2,877,- 791. Such valve constructions find widespread and important use in the gas industry as relief valves of large capacity and positive shut-off, and are provided with pilot control for back-pressure or safety relief service at compressor, town border and district regulator stations. It is important that such valves be rugged, compact, accurate and stable, and simple in structure for ease of maintenance.

Although flexible diaphragm flow control valves of the type employing a supporting grid structure, which the diaphragm is adapted to tightly seat against and "peel away" from in response to flow conditions for control and regulation thereof, have been long and well known in the past, improvements in the particular configuration of the supporting grid structures enable the achievement of important and unexpected advances in the performance characteristics of such control devices.

It is a primary object of this invention, therefore, to provide a flexible diaphragm flow control valve of substantially improved efficiency and reliability, capable of stable performance under allowable pressure drop conditions of substantial magnitude.

It is another object of this invention to provide an expansible member valve having an elongated supporting grid structure providing a plurality of peripherally spaced axial flow conduits at each side of a transverse flow barrier, wherein the flow conduits each have flow communication with the diaphragm-grid interface in peripherally staggered and axially spaced relation.

It is a further object to provide an expansible diaphragm supporting grid structure comprising a plurality of stacked plates, each particularly formed and oriented to provide a plurality of peripherally staggered and axially spaced flow slots at the diaphragm-grid interface.

It is still another object to provide a grid structure of the type aforesaid, employing a plurality of identical stamped metal discs in consecutive and alternate orientation, whereby manufacture in quantity and at reasonable cost is facilitated.

It is still a further object to provide an expansible member valve for large capacity flow use which is capable of positive shut-off, and wherein the resilient diaphragm member is capable of responding to substantial volumetric "swell" without risk of binding within the valve casing structure.

With these and other objects in view, my invention consists in the construction, arrangement, and combination of the various parts of my device whereby the objects contemplated are attained, as hereinafter more fully set forth, pointed out in my claims, and illustrated in the accompanying drawing, wherein:

Figure 1 is a cross-sectional view showing a flexible diaphragm flow control valve constructed in accordance with the present invention, wherein the flexible diaphragm is shown in its closed-flow position of seated engagement against the supporting grid structure;

Figure 2 is a fragmentary cross-sectional view of the construction shown in Figure 1, wherein the flexible diaphragm is shown in its open-flow position, stretched in spaced relation to the supporting grid structure;

Figure 3 is a fragmentary cross-sectional view taken substantially as indicated along the line 3—3 of Figure 1;

Figure 4 is an exploded perspective view of three plate elements of the grid stack assembly, illustrating their configuration and respective alternate orientation; and Figure 5 is a fragmentary perspective view of the grid plate stack at the transverse flow barrier, illustrating the flow pattern outwardly through the staggered and axially spaced flow slots below the barrier and between the diaphragm-grid interface, upwardly about the barrier, and inwardly through the corresponding flow slots above the barrier.

Referring now more particularly to the drawing, I have indicated generally at 10 in Figure 1 a hollow globe type valve body having longitudinally aligned flow inlet and flow outlet fitting portions 12 and 14, defining respectively an upstream or inlet passageway 16 and a downstream or outlet passageway 18. The particular valve body 10 is intended to be illustrative only of one typical embodiment of the present invention, and it will be understood that the valve body may alternatively be of any suitable angle configuration. Reference may be made to my said copending application for illustration of various valve body arrangements adapted for commercial utilization with flexible diaphragm flow control devices.

The body 10 provides an angularly tubular partition portion 20 intermediate the inlet and outlet passageways 16 and 18. In this way, an annular up-flow passage 22 and tubular down-flow passage 24 are defined. An access plug fitting 26 enables communication at the upstream side of the valve body 10. An annular base plate 28 overlies the passages 22 and 24, and provides a plurality of flow ports 30, in alignment with the annular up-flow passage 22, and a central opening 32, in alignment with the tubular down-flow passage 24. Inner and outer O-ring seals 33 and 34 are provided to insure a fluid-tight assembly of parts.

A hollow diaphragm casing 36 is secured to the valve body 10 above the base plate 28 by means of a suitable flange and cooperating mounting bolt assembly 38. An outlet chamber 40 is defined within the casing 36 below the top wall thereof, and an access plug fitting 41 permits communication at the downstream side of the valve body 10. A pilot operating pressure inlet fitting 42 is provided in a side wall portion of the casing for admission of a regulating diaphragm-loading pressure. Any suitable form of operating device may be utilized in combination with the valve structure of the present invention, and reference may be made to my copending application Serial No. 745,416, filed June 30, 1958, for a detailed description of direct operated reset pilot devices suitable for effecting control of the present invention by means of the upstream operating fluid.

The novel diaphragm-supporting grid plate stack of the present invention is indicated generally at 44. A generally cylindrical backing wall 46 provides an inner boundary surface for the stack 44. The wall 46 is formed with an inwardly tapered lower end flange 48 and a threaded upper end lip 50. A chamber 52 is defined within the wall 46 in communication with the casing chamber 40 and in coaxial flow alignment with the passage 24. A locking ring 54 is threadedly secured at the upper end lip 50 of the backing wall 46 and serves to overlie and compressingly engage the stack 44 in assembled and seated relation upon the base plate 28. A flexible diaphragm 56 surrounds the external surface of the stack 44, and is normally in resilient and substantially full, tight seating engagement thereagainst, as seen in Figure 1 of the drawing. The diaphragm 56 is formed with an inwardly directed upper mounting flange 58, which overlies the top of the stack 44, and an outwardly directed lower mounting flange 59, which overlies the base plate 28. The casing 36 serves to tightly and sealingly engage the flanges 58 and 59 to complete the fixed assembly of parts, and defines a pilot operating pressure chamber 60 in communication with the inlet fitting 42.

The novel structure and configuration of the grid plate stack 44 will now be described in detail. The stack comprises a plurality of plates 62 of particular annular shape and symmetrical slotting. The separate plate elements 62 of the stack 44 are identical, and three consecutive, immediately adjacent plates of the stack assembly have been indicated in Figure 4 at 62a, 62b, and 62c respectively. Each plate 62 is of generally annular shape and provides a large central opening 64, the peripheral edge of which is adapted to engage the outer cylindrical surface of the backing wall 46. Each plate 62 provides a peripherally spaced plurality of generally trapezoidal-shaped apertures 66, which are alternately arranged with a corresponding plurality of generally trapezoidal-shaped edge notches 68.

The plurality of individual plates 62 are stacked in alternate and circumferentially displaced orientation so that the apertures 66 of one plate are aligned with the edge notches 68 of immediately adjacent plates, and so that the edge notches 68 of such plate are aligned with the apertures 66 of the immediately adjacent plates. In Figure 4 of the drawing, the respective notches and apertures of the plates 62a, 62b, and 62c have also been designated with the same corresponding letters, and it will be apparent that the edge notches 68a of the upper plate 62a are aligned in overlying relation with the apertures 66b of the intermediate plate 62b, and with the edge notches 68c of the lower plate 62c. Similarly, the apertures 66a are aligned with the edge notches 68b, and the apertures 66c. In order to facilitate manufacture and assembly, suitable reference or assembly and alignment means may be provided on each identical plate 62. For example, bolt holes 69 and 70 may be employed, and every other plate turned "upside down" as the stack is formed so as to effect the previously described alternate circumferential alignment of the various apertures and edge notches.

As best seen in Figure 1 of the drawing, the stack 44 comprises upper and lower sections at each side of a central annular barrier member 72. The inner peripheral edge of the barrier 72 cooperates with an O-ring 73 for fluid-tight engagement against the outer surface of the backing wall 46. The outer peripheral surface of the barrier 72 is in generally cylindrical surface continuity with the aligned outer edges of the plurality of stacked plates 62.

As best seen in Figures 1, 2 and 5 of the drawing, the consecutive and alternately aligned apertures 66 and edge notches 68 cooperate to define a plurality of peripherally spaced axial flow conduits, the upstream conduits being designated at 74 and the downstream conduits at 76. Each of the flow conduits has lateral flow communication through the edge notches 68 of alternate consecutive plates 62 with the external surface edges thereof. In this way, the edge notches 68 serve to define at the interface with the diaphragm 56 a plurality of peripherally staggered and axially spaced flow slots 78. The flow area of the slots 78 may be controlled by predetermined selection of the axial thickness of the plate 62 and the peripheral width of the edge notches 68.

*Practical operation*

Referring more particularly to Figures 1, 2 and 5 of the drawing, the practical valving operation of the flexible diaphragm 56 and its novel supporting grid structure 44 will now be described. It may be assumed that a suitable fluid under pressure, such as gas for combustion purposes, will be introduced from an upstream source, through the inlet passageway 16, for controlled discharge to a point of demand, from the outlet passageway 18. A suitable pilot control pressure will be introduced at the fitting 42 into the chamber 60 for regulated control of the valving operation in accordance with downstream demand conditions. The upstream or inlet pressure of the fluid being controlled will pass from the inlet passageway 16 upwardly through the annular passage 22 and ports 30 into the lower axial flow conduits 74 of the stack 44. The fluid will pass upwardly therethrough to the barrier 72, and transversely or radially outwardly through alternate plates to the generally cylindrical interface between the plate peripheral edges and the flexible diaphragm 56 seated thereagainst. When the inlet pressure is sufficiently large relative to the pilot loading pressure within the chamber 60, the flexible diaphragm 56 will respond to the pressure differential and effect a resilient expansion away from the barrier 72, and progressively away from the adjacent plates 62 at each side thereof. In this way, the fluid will be permitted to pass outwardly through the staggered and axially spaced flow slots 76 of the stack portion below the barrier 72, upwardly about the outer periphery of the barrier 72, and inwardly through the corresponding flow slots 78 of the stack portion above the barrier 72 for flow through the corresponding axial flow conduits 76 thereof into the chamber 40 of the casing 36. Discharge flow may then be effected through the chamber 52 and passage 24 to the outlet passageway 18.

It will be understood that the identical flow path may be effected in reverse for flow of fluid from passageway 18 to passageway 16. Because of the complete geometric symmetry of the inlet and outlet sections of the grid structure, the flexible diaphragm valve of this invention is readily adaptable to practical installations requiring directional flow either from passageways 16 to 18, as described in detail above, or in the same flow pattern and manner of operation from passageways 18 to 16.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a flexible diaphragm flow control device of the type comprising a hollow valve body having a flow inlet and a flow outlet, grid means providing a supporting structure disposed within said body intermediate said flow inlet and outlet, the external surface of said grid means defining a valve seat, a flow barrier intermediate the ends of said grid means, one end of said grid means communicating with said flow inlet and the other end communicating with said flow outlet, an expansible diaphragm member overlying the external surface of said grid means, said diaphragm being normally stretched over said grid means in substantially full seating engagement with the entire external surface thereof, and means for pressure loading said diaphragm; the improvements wherein said grid means comprises a plurality of stacked plates at each side of said flow barrier, said plates being notched and apertured to define collectively a plurality of peripherally spaced axial flow conduits each having flow communication through a plurality of flow slots with the external surface thereof, the flow slots of respective adjacent conduits being disposed at the interface with said diaphragm in peripherally staggered and axially spaced relation.

2. In a flexible diaphragm flow control device of the type comprising a hollow valve body having a flow inlet and a flow outlet, grid means providing a supporting structure of generally cylindrical shape disposed within said body intermediate said flow inlet and outlet, the external surface of said grid means defining a valve seat, a transversely disposed flow barrier intermediate the ends of said grid means, one end of said grid means communicating with said flow inlet and the other end communicating with said flow outlet, an expansible diaphragm member of generally cylindrical shape overlying the external surface of said grid means, said diaphragm being normally stretched over said grid means in substantially full seating engagement with the entire external surface thereof, and means for pressure loading said diaphragm; the improvement wherein said grid means comprises a plurality of identical cylindrical plates stacked at each side of said flow barrier, said plates being notched and apertured to define collectively a plurality of peripherally spaced axial flow conduits each having flow communication through a plurality of flow slots with the external surface thereof, the flow slots of respective adjacent conduits being disposed at the interface with said diaphragm in peripherally staggered and axially spaced relation.

3. In a flexible diaphragm flow control device of the type comprising a hollow valve body having a flow inlet and a flow outlet, grid means providing a supporting structure disposed within said body intermediate said flow inlet and outlet, the external surface of said grid means defining a valve seat, a flow barrier intermediate the ends of said grid means, one end of said grid means communicating with said flow inlet and the other end communicating with said flow outlet, an expansible diaphragm member overlying the external surface of said grid means, said diaphragm being normally stretched over said grid means in substantially full seating engagement with the entire external surface thereof, and means for pressure loading said diaphragm; the improvement wherein said grid means comprises a plurality of stacked plates at each side of said flow barrier, each plate having alternate edge notches and apertures about its periphery, the apertures and notches respectively of any one plate being in alignment with the notches and apertures respectively of each immediately adjacent plate, whereby to provide in each stack a plurality of peripherally spaced axial flow conduits each having flow communication through the edge notches of alternate consecutive plates with the external surface thereof, and whereby to define at the interface with said diaphragm a plurality of peripherally staggered and axially spaced flow slots each dimensionally predetermined by the peripheral length of the edge notch and the axial thickness of the plate.

4. In a flexible diaphragm flow control device of the type comprising a hollow valve body having a flow inlet and a flow outlet, grid means providing a supporting structure disposed within said body intermediate said flow inlet and outlet, the external surface of said grid means defining a valve seat, a flow barrier intermediate the ends of said grid means, one end of said grid means communicating with said flow inlet and the other end communicating with said flow outlet, an expansible diaphragm member overlying the external surface of said grid means, said diaphragm being normally stretched over said grid means in substantially full seating engagement with the entire external surface thereof, and means for pressure loading said diaphragm; the improvement wherein said grid means comprises a plurality of identical stacked plates at each side of said flow barrier, each plate having alternate edge notches and apertures about its periphery, the identical stacked plates at each side of said flow barrier being consecutively alternately oriented to dispose the apertures and notches respectively of any one plate in alignment with the notches and apertures respectively of each immediately adjacent plate, whereby to provide in each stack a plurality of peripherally spaced axial flow conduits each having flow communication through the edge notches of alternate consecutive plates with the external surface thereof, and whereby to define at the interface with said diaphragm a plurality of peripherally staggered and axially spaced flow slots each dimensionally predetermined by the peripheral length of the edge notch and the axial thickness of the plate.

5. In a flexible diaphragm flow control device of the type comprising a hollow valve body having a flow inlet and a flow outlet, grid means providing a supporting structure of generally cylindrical shape disposed within said body intermediate said flow inlet and outlet, the external surface of said grid means defining a valve seat, a transversely disposed flow barrier intermediate the ends of said grid means, one end of said grid means communicating with said flow inlet and the other end communicating with said flow outlet, an expansible diaphragm member of generally cylindrical shape overlying the external surface of said grid means, said diaphragm being normally stretched over said grid means in substantially full seating engagement with the entire external surface thereof, and means for pressure loading said diaphragm; the improvement wherein said grid means comprises a plurality of stacked plates at each side of said flow barrier, each plate having alternate edge notches and apertures about its periphery, the apertures and notches respectively of any one plate being in alignment with the notches and apertures respectively of each immediately adjacent plate, whereby to provide in each stack a plurality of peripherally spaced axial flow conduits each having radial flow communication through the edge notches of alternate consecutive plates with the external surface thereof, and whereby to define at the interface with said diaphragm a plurality of peripherally staggered and axially spaced flow slots each dimensionally predetermined by the peripheral length of the edge notch and the axial thickness of the plate.

References Cited in the file of this patent

UNITED STATES PATENTS

| | | |
|---|---|---|
| 2,622,620 | Annin | Dec. 23, 1952 |
| 2,818,880 | Ratelband | Jan. 7, 1958 |

FOREIGN PATENTS

| | | |
|---|---|---|
| 66,820 | Holland | of 1950 |